June 13, 1939.　　W. H. FRANK ET AL　　2,162,344
PANEL BOARDS AND PARTS THEREOF
Original Filed Dec. 26, 1935　　2 Sheets-Sheet 1

INVENTORS
William H. Frank
Lawrence E. Fisher
BY
Daniel J. Cullen ATTORNEY

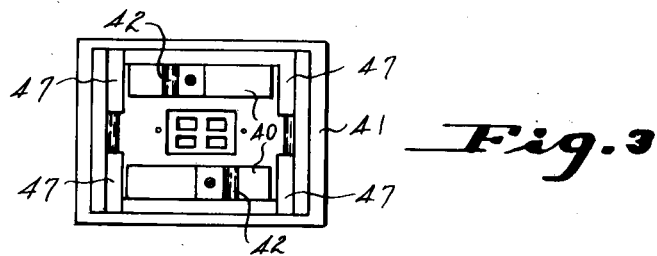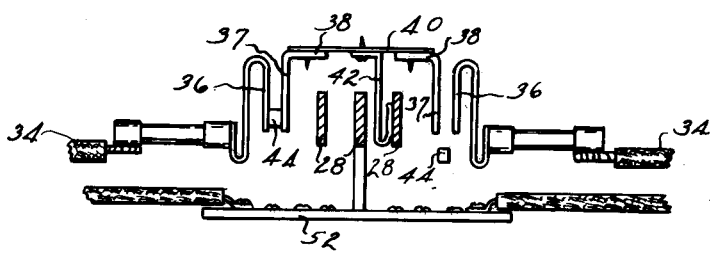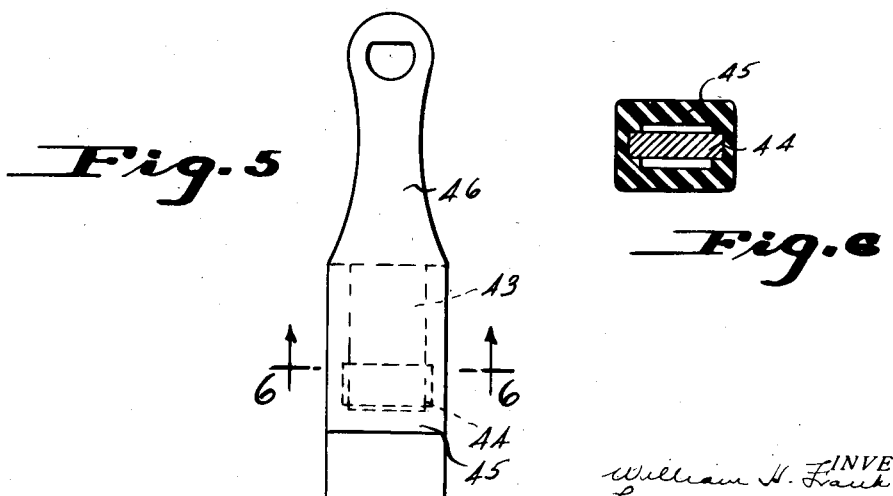

Patented June 13, 1939

2,162,344

UNITED STATES PATENT OFFICE 2,162,344

PANEL BOARDS AND PARTS THEREOF

William H. Frank and Lawrence E. Fisher, Detroit, Mich.

Original application December 26, 1935, Serial No. 56,227, now Patent No. 2,103,069, dated December 21, 1937. Divided and this application March 8, 1937, Serial No. 129,651

2 Claims. (Cl. 175—369)

This application relates to distribution panels and is a division of a prior application, Serial No. 56,227 filed December 26, 1935, now Patent No. 2,103,069 of December 21, 1937.

It is common practice in the art of panel board construction to make the panel of units so that the panels are of the sectional type, and the panel here shown follows this practice. The panel here shown, however, differs from sectional panels heretofore known in features of construction of the units per se, in features of construction of the switches which form part of the units, and in other features of construction.

One feature of design is a novel construction for the units per se and particularly for the switches of the same. The units have on their backs slots receiving bus bars disposed edgewise therein and the units are provided with novel switching arrangements for connecting branch circuits to these bus bars.

The switches of the units include stationary contacts and movable contacts carried by slides forming parts of housings terminating in handles projecting forwardly from the units and mere reciprocation of these housings manually accomplishes the desired switching operations.

Still further objects of the invention will readily occur to those skilled in the art upon reference to the following description and the accompanying drawings, in which:

Fig. 3 is a bottom plan view of a unit switch section cover;

Fig. 4 is a connection and switching diagram;

Fig. 5 is a section on line 5—5 of Fig. 1, showing a movable switching element;

Fig. 6 is a section on line 6—6 of Fig. 5.

Figure 1:
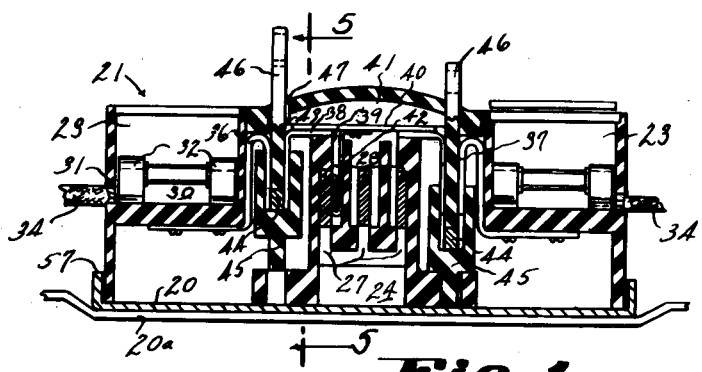
Fig. 1 is an enlarged section of a unit on line 1—1 of Fig. 2.
Figure 2:
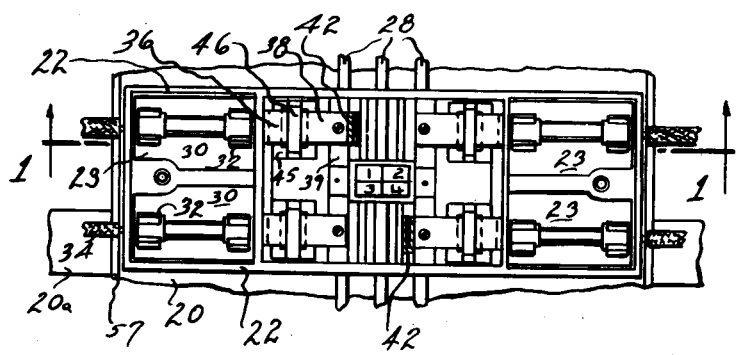
Fig. 2 is a front elevation of a unit, with the covers thereof removed.

The panel here shown may be disposed in a sheet metal cabinet on whose back is a mounting plate 20 supported by straps 20a, and against this plate and disposed one above the other are the units 21 which form the panel.

The unit

Each unit 21 comprises a body composed of molded insulation or the like formed to provide top and bottom walls 22, and sections 23, and a central switch containing section 24 in whose back wall are rearwardly opening slots 27 extending from top to bottom of the unit; the slots 27 of adjacent units align to form continuous channels which run from the top to the bottom of the panel and in which are disposed edgewise the main bus bars 28.

The end blocks are formed with cavities 30 open to the front of the unit and these cavities are provided with entrance holes 31 opening to the adjacent end walls of the unit. In the cavities are fuse receivers 32 which may be in the form of socket shells or in the form of fuse clips, and the fuse receivers are equipped with wire connection screws by means of which branch circuit wires 34, introduced into the cavities 30 through the entrance holes 31 thereof, may have their terminals physically and electrically connected to the fuse receivers.

The switches

For the fuse receivers there are stationary contacts 36 in the switch sections of the unit, and aligned with these contacts are other stationary contacts 37 terminating in lugs 38 in front of ledges 39 of the switch section of the unit. Aligned lugs 38 are bridged by bridging straps 40 formed on the cover 41 of the switch section, which bridge straps are equipped with resilient contact prongs 42 adapted to engage predetermined ones of the three bus bars 28 of the panel, with the result that proper ones of the contacts 37 are electrically connected to proper ones of the bus bars 28 when the switch section cover 41 is in place.

For electrically switching contacts 36 to contacts 37 and thus to connect the branch conductors to the supply bus bars, there are disposed between the pairs of contacts 36—37 insulation slides 43 having slugs 44 of conducting material. The slides are formed as parts of housings 45 which closely surround the contacts 36—37, with each of these contacts received in a cell between a slide 43 and its housing. When the housings are pulled towards the front of the unit, the slugs 44 thereof bridge the adjacent contacts 36—37 for establishing connections between the bus bars and the branch circuit conductors. On the other hand, when the housings are pushed rearwardly, by means of the handle portions 46 thereof which project through slots 47 of the switch section cover 41, the slugs are out of engagement with contacts 36—37 and the circuits controlled by such housings are open.

It will be observed that the mere act of placing the switch section cover 41 on the front of the unit electrically connects the switches to the bus bars and that mere removal of such cover, providing access to these switches, automatically disconnects these switches from the bus bars.

It will also be observed that the proper positioning of the contact prongs 42 on the cover 41 determines the selection of the bus bars 28 to be connected to the bridging straps of the cover 41 and to the branch circuit conductors controlled by such bridging straps and the switches connected to such straps.

We claim:

1. A panel unit having a portion provided with open back slots in which are bus bars, pairs of alined contacts within the unit, with one pair for each branch circuit conductor, a front manipulable switch for each pair of contacts for interconnecting the two contacts of each pair, and a removable cover portion having a strap connecting one contact of one pair with one contact of another and equipped with a bus bar engaging prong.

2. A panel unit having a portion provided with open back slots in which are bus bars, pairs of alined contacts within the unit, with one pair for each branch circuit conductor, a front manipulable switch for each pair of contacts for interconnecting the two contacts of each pair, and a removable cover portion having a strap connecting one contact of one pair with one contact of another and equipped with a bus bar engaging prong, each switch including a slide of insulation mounting the movable contact and having rearwardly disposed portions encompassing each free portion of the stationary contacts, the interiors of such portions to be evacuated on switch opening.

WILLIAM H. FRANK.
LAWRENCE E. FISHER.